United States Patent [19]

Dahl

[11] Patent Number: 4,613,973
[45] Date of Patent: Sep. 23, 1986

[54] DIGITAL DATA DECODER AND METHOD

[75] Inventor: Warren J. Dahl, Midvale, Utah

[73] Assignee: Eaton-Kenway, Inc., Salt Lake City, Utah

[21] Appl. No.: 746,695

[22] Filed: Jun. 20, 1985

[51] Int. Cl.$^4$ .................................................. H04L 27/00
[52] U.S. Cl. ...................................... 375/37; 328/28; 307/261
[58] Field of Search ............... 375/37, 97; 328/28, 328/31, 57, 150; 307/106, 261, 268, 360

[56] References Cited

U.S. PATENT DOCUMENTS

| | | | |
|---|---|---|---|
| 3,187,260 | 6/1965 | Dove | 375/36 |
| 3,617,769 | 11/1971 | Hanson | 307/261 |
| 3,693,028 | 9/1972 | Fussell | 328/31 |
| 4,007,382 | 2/1977 | Warberg | 307/351 |
| 4,222,008 | 9/1980 | Mezrich | 328/28 |
| 4,333,024 | 6/1982 | Maussion | 328/28 |
| 4,535,294 | 8/1985 | Ericksen et al. | 307/261 |

Primary Examiner—Robert L. Griffin
Assistant Examiner—Stephen Chin
Attorney, Agent, or Firm—Lynn G. Foster

[57] ABSTRACT

A system, including methods and apparatus, requiring digital communication between two devices using radio frequency communications to provide the link. Apparatus for decoding a digital data stream is provided, which data stream has been imposed on a base band signal where the rate of data transmission is as high as twice the frequency of the base band signal. A differential amplifier is employed to recognize the beginning and end of a segment of a wave cycle which represents a digital bit.

20 Claims, 4 Drawing Figures

4,613,973

DIGITAL DATA DECODER AND METHOD

FIELD OF INVENTION

This invention relates generally to digital data transmission and, in particular, to systems comprising methods and apparatus wherein digital communication between two devices is achieved by radio frequency transmission, with or without connecting wires, and further requiring a data transmission rate (baud rate) on the order of as much as twice as fast as the frequency of the base band signals.

PRIOR ART

It is known to transmit data by interrupting an electric current or wave. The rate of data transmission, however, is limited by the frequency of the wave carrying the data. Previously, many of the techniques have required the frequency of the base band signal to exceed the rate of data transmission by at least a factor of 2 or more. The base band represents the band of frequencies occupied by a signal before it modulates the carrier frequency to form the transmitted line or radio signal. Heretofore, if the frequency of the base band was constrained below some maximum value, the rate of data transmission was also constrained. In particular, regulatory requirements for low-power, unlicensed, local radio transmitters have mandated base bands with frequencies on the order of 5 KHz. Using prior art techniques, data transmission rates on the order of only 2400 bits per second (baud) can be obtained, a rate substantially below the 9600 baud rate commonly employed in digital data transmission.

BRIEF SUMMARY AND OBJECTS OF THE INVENTION

The disadvantages of the prior art are substantially alleviated if not overcome with the present invention which, in brief summary, provides a rate of data transmission which is essentially twice the frequency of the carrier waves at low cost and with relatively little signal processing.

Systems requiring digital communication between two devices can use a radio frequency wave to provide the connection. A particular example is a connection between a stationary control computer and a mobile sensor or mechanical device. The FCC has reserved a band of frequencies near 450 MHz for this purpose. In order to obtain FCC approval respective a transmitter for such data transmission, a plurality of manufacturers, such as Repco Corporation, supply modem units that shape the input signals to maintain a base band frequency essentially less than 4.5 KHz. If ordinary reception techniques are used, this process limits transmission rates of digital signals to baud rates just greater than 2400 bits per second. If higher baud rates, for example 9600 baud, are imposed on the base band signal, the output of the modulation unit of the transmitter and, therefore, the input of the data receiver, becomes almost sinusoidal. Prior art receivers require an input which is essentially a square wave, providing an "edge" to trigger logic circuits necessary to re-assemble the data.

Accordingly, it is a primary object of the present invention to provide improved methods and apparatus for recovering digital data from a modulated carrier wave.

Another important object of this invention is to discriminate against noise which may be caused by the method or apparatus for recovering digital data.

An additional significant object is to provide an absolute value circuit to insure that all voltage transitions inputs to a latching circuit correspond to data impulses.

These and other objects and features of the present invention will be apparent from the detailed description taken with reference to the accompanying drawings.

DETAILED DESCRIPTION OF THE ILLUSTRATED EMBODIMENT

Figure 1:
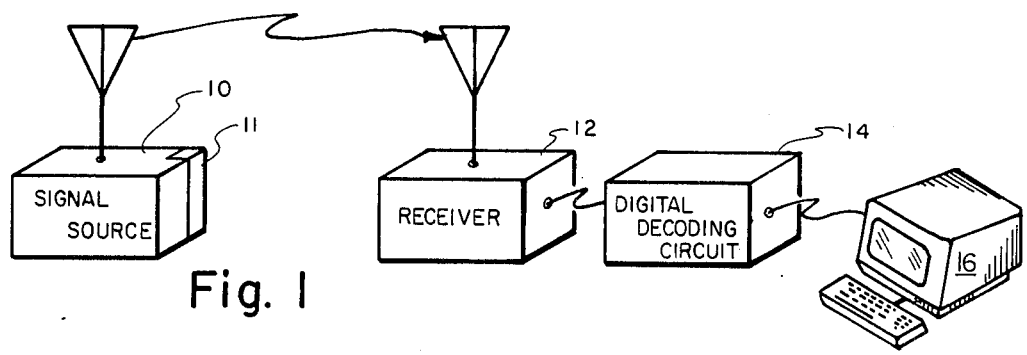
FIG. 1 is a three dimensional schematic showing the relationship of a presently preferred digital data decoder embodiment of the invention to other apparatus.

Referring now to FIG. 1 for purposes of preferred embodiment illustration, a conventional external signal source 10 imposes, diagrammatically illustrated at site 11 of source 10, digital data at an appropriate rate, for example 9600 baud on a base band signal of frequency essentially equal to one-half of the baud rate. Said base band signal modulates a carrier wave of appropriate frequency, for example 450 MHz. The carrier wave is transmitted from the source 10 to a conventional receiver 12, for example, a Repco receiver #RDRXN6NCC.

The output of the receiver 12 is communicated to a novel digital decoding circuit 14. The digital decoding circuit 14 produces a digital signal which is communicated to a suitable device, for example, a computer 16.

Figure 2:
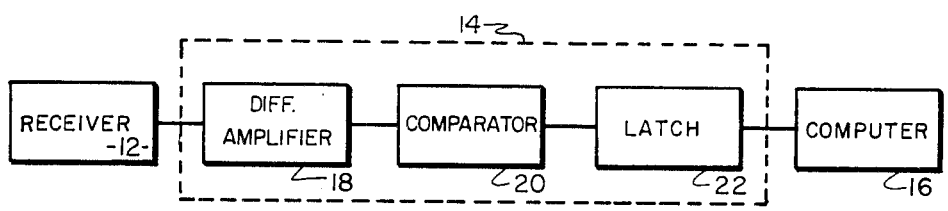
FIG. 2 is a simplified block diagram of the presently preferred digital data decoder embodiment of the invention.

Referring to FIG. 2, the digital decoding circuit 14, as presently preferred, comprises seriatim a differential amplifier 18, a comparator circuit 20 and a latch circuit 22.

The differential amplifier 18 produces distinct voltage spikes corresponding to voltage transitions of the waveform received from the receiver 12 accross a zero voltage. A positive voltage spike is produced whenever the waveform passes from negative to positive, and a negative voltage spike is produced whenever the waveform passes from positive to negative.

The comparator circuit 20 produces two voltages, a first voltage which is interrupted whenever the output of the differential amplifier 18 exceeds a certain pre-determined value and a second voltage which is interrupted whenever the output of the differential amplifier 18 is less than a certain pre-determined value.

The latch circuit 22 combines two outputs of the comparator circuit 20 into a digital data stream.

Figure 3:
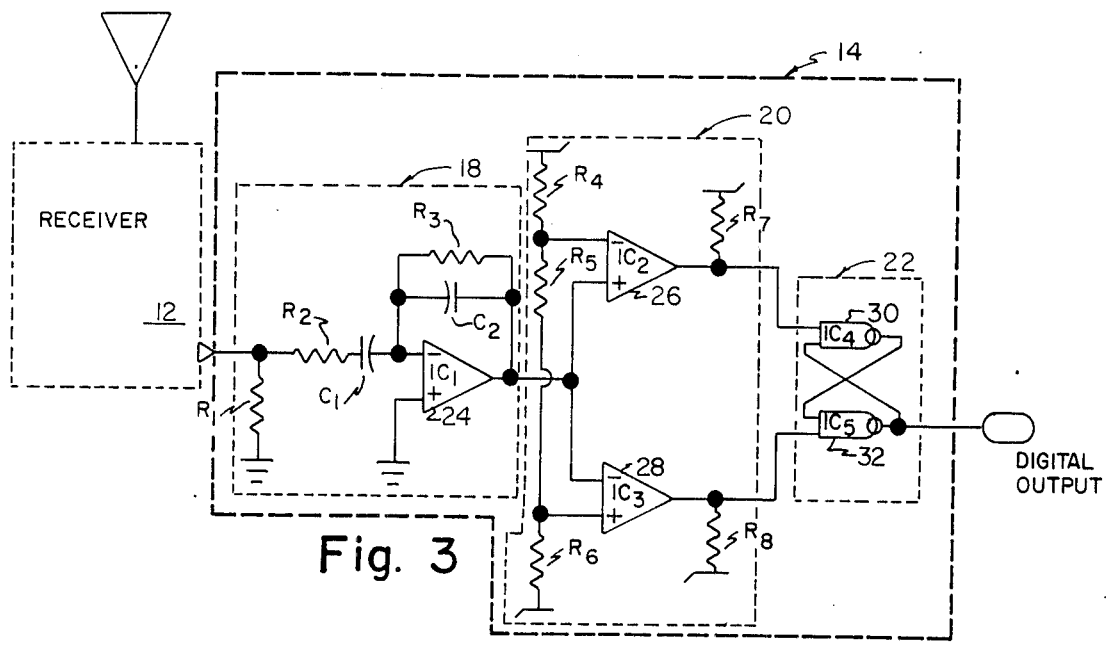
FIG. 3 is a circuit diagram of the presently preferred data decoder embodiment of the invention.

Referring to FIG. 3, the output of the receiver 12 is provided with a load resistor R1, chosen to balance the capacitively coupled output of discriminator circuitry contained within the receiver 12. A representative output 36 (FIG. 4) from the receiver 12 comprises a digital data stream 34 which has been distorted by modulation and demodulation of a carrier wave. The output 36, is passed to the differential amplifier 18, which comprises an appropriate integrated circuit 24, [for example an LF357 available from National Semiconductor] together with resistors R2 and R3 and capacitors C1 and C2, which function in a known fashion. The integrated circuit 24 is biased to function as a differentiation device by resistor R3 and capacitor C2. Resistor R2 and capacitor C1 are provided for the purpose of limiting input band width to supress noise.

Figure 4:
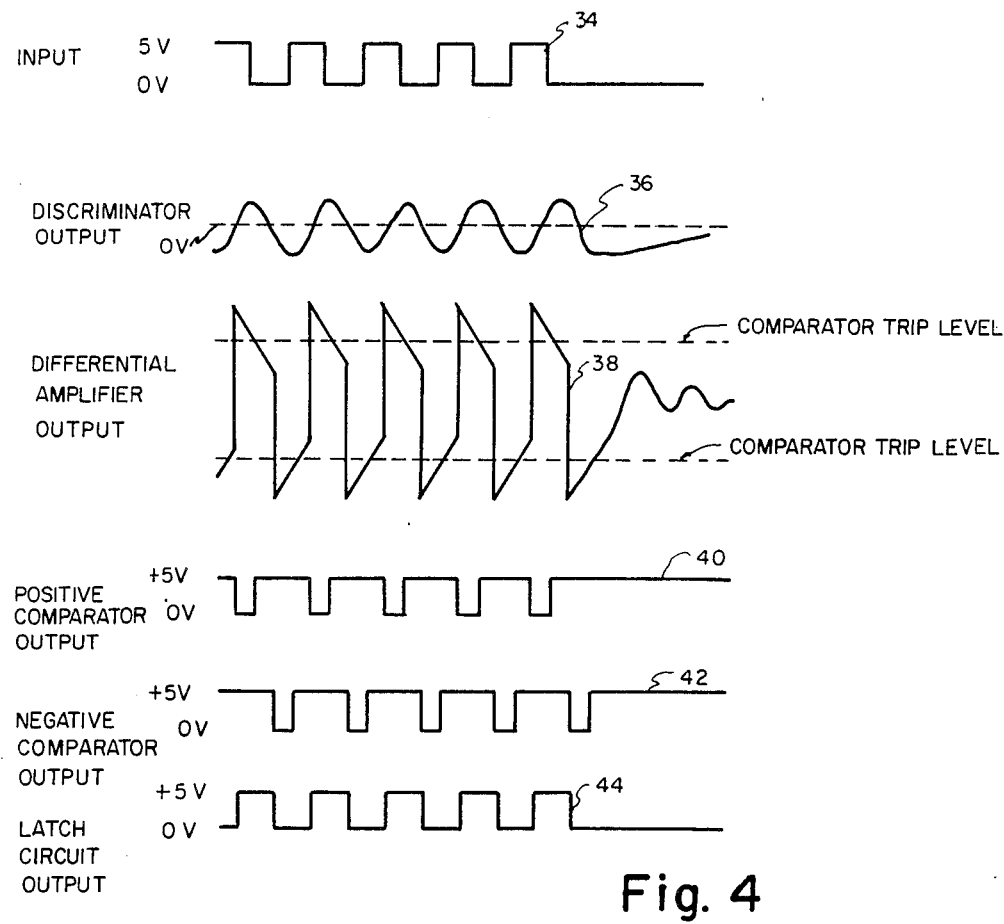
FIG. 4 is a timing diagram showing representative waveforms involved in practicing the present invention.

Given the data stream 34, the output of the differential amplifier 18 comprises a waveform 38 (FIG. 4). The maximum amplitude of waveform 38 is adjusted to a suitable value, for example, in excess of 6.5 volts positive and negative, by either adjusting the amplitude of waveform 36 at the output of receiver 12, or by chosing appropriate values for resistors R2 and R3 and capacitors C1 and C2.

The output 38 of the differential amplifier 18 is communicated to the comparator circuit 20, which comprises at least two comparator components, i.e. a positive voltage comparator 26 and a negative voltage comparator 28. Comparators 26 and 28 are provided with suitable comparison voltages through resistors R4, R5 and R6 and pull-up resistors R7 and R8. A satisfactory integrated circuit for comparators 26 and 28 is an LM339 available from National Semiconductor. In the preferred embodiment, the comparison voltages are provided by a source of positive potential and a source of negative potential connected by a plurality of resistors R4, R5 and R6 in series. For example, if a positive source of +24 volts and a negative source of −24 volts are provided, proper values for the resistors would be 3.3K ohms for resistor R4 and resistor R6 and 8.8K ohms for resistor R5. This will produce comparison voltages of approximately +6.5 volts for positive comparator 22 and −6.5 volts for negative comparator 24.

Pull-up resistors R7 and R8, with associated voltage sources, are selected to provide output voltages for positive comparator 26 and negative comparator 28 at TTL signal levels, for example, +5 volts.

The function of the positive comparator 26 is to interrupt a current at the output of positive comparator 26 whenever and as long as the amplitude of waveform 38 exceeds the positive comparison voltage, for example +6.5 volts. A representative output 40 from positive comparator is shown in FIG. 4.

The function of the negative comparator 28 is to interrupt a current at the output of negative comparator 28 whenever and as long as the amplitude of waveform 38 is less than the negative comparison voltage, for example −6.5 volts. A representative output 42 from negative comparator is shown in FIG. 4.

The two outputs of the comparator circuit 20 are respectively applied to the inputs of a latch circuit 22. For example, in the preferred embodiment, the latch circuit may comprise two negative logic AND gates 30 and 32 connected as shown. A suitable flip-flop circuit comprising AND gates 30 and 32 is an SN74279 available from Texas Instruments. A low logic level at the input of AND gate 30 will set the latch output to a logic level "high". The latch output is reset to "low" by a "low" logic level at the input of AND gate 32. The latch circuit output 44 (FIG. 4) represents a stream of digital data corresponding to the digital input 34.

The values of circuit components are not critical to the operation of the present invention. Of course, the combinations of resistors and capacitors are chosen such that the response time (or "time constant") of the differentiating circuit is compatible with the input frequency from the receiver 12. Variations and modifications may be made without departing from the present invention.

This invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for communicating digital data by radio frequency comprising:
   first site means generating digital data;
   second site means, remote from the first site means, utilizing digital data corresponding to the digital data of the first site means;
   the first site means comprising radio frequency transmitter means superimposing the digital data from the first site means upon a carrier waveform to create and transmit a composite sinusoidal wave form containing said digital data;
   receiver means comprising the second site means remote from the radio frequency transmitter means receiving and processing said composite sinusoidal waveform;
   said receiver means comprising means which demodulate a base band signal from the composite waveform;
   means to which the base band signal is communicated, said last mentioned means creating positive and negative voltage spikes each time the base band signal goes positive and negative, respectively;
   means at first and second comparator sites to which said voltage spikes are communicated;
   means at each comparator site comparing the voltage of said spikes to a predetermined voltage level, the comparison at the two sites being of opposite polarity, respectively;
   means at each comparator site normally issuing a constant known voltage signal and means interrupting said constant voltage signal when any said voltage spike exceeds the predetermined voltage level, either in the positive or in the negative, depending on the site;
   means which receive the two interrupted voltage signals and combine the two interrupted voltage signals into a single output digital signal.

2. Apparatus according to claim 1 wherein the receive means comprise means which issue a constant voltage at each interruption of the first interrupted voltage signal and means which produce zero voltage at each interruption of the second interrupted voltage signal.

3. Apparatus according to claim 1 wherein the receive means comprise means producing a data transmission rate substantially equal to twice the frequency of the base band signal.

4. Apparatus according to claim 3 wherein the demodulating means comprise means which produce a base band signal having a frequency of on the order of 4800 Hz and wherein the producing means comprise means which generate an output data transmission rate of on the order of 9600 BAUD.

5. Apparatus for producing square waveforms corresponding to sinusoidal input waveforms comprising:
  a source of sinusoidal waveforms;
  means to which the sinusoidal waveforms are communicated, said means creating positive and negative voltage spikes each time the sinusoidal waveform goes positive and negative, respectively;
  means at first and second comparator sites to which said voltage spikes are communicated;
  means at each comparator site comparing the voltage of said spikes to a predetermined voltage level, the comparison at the two sites being of opposite polarity, respectively;
  means at each comparator site normally issuing a constant known voltage signal and means interrupting said constant voltage signal when the voltage spike exceeds the predetermined voltage level, either in the positive or in the negative, depending on the site; and
  means which receive the two interrupted voltage signals and integrate the two interrupted voltage signals into a single output square wave signal.

6. Apparatus according to claim 5 wherein the last mentioned means comprise means to which issue a constant voltage at each interruption of the first interrupted voltage signal and means which produce zero voltage caused at each interruption of the second interrupted voltage signal.

7. Apparatus for communicating digital data by sinusoidal waveforms comprising:
  a source of digital data wherein the digital data is represented by sinusoidal waveforms, each half cycle substantially representing a digital bit;
  means to which the sinusoidal waveform is communicated, said means creating positive and negative voltage spikes each time the sinusoidal waveform goes positive and negative, respectively;
  means at first and second comparator sites to which said voltage spikes are communicated;
  means at each comparator site comparing the voltage of said spikes to a predetermined voltage level, the comparison at the two sites being of opposite polarity, respectively;
  means at each comparator site normally issuing a constant known voltage signal and means interrupting said constant voltage signal when the voltage spike exceeds the predetermined voltage level, either in the positive or in the negative depending on the site; and
  means which receive the two interrupted voltage signals and integrate the two interrupted voltage signals into a single output digital signal.

8. Apparatus according to claim 7 wherein the last mentioned means comprise means which issue a constant voltage at each interruption of the first interrupted voltage signal and means which produce zero voltage caused by each interruption of the second interrupted voltage signal.

9. Apparatus according to claim 7 wherein the last mentioned means comprise means producing an output digital signal which has a data transmission rate substantially equal to twice the frequency of the base band signal.

10. Apparatus according to claim 9 wherein the demodulating means comprise means which produce a base band signal having a frequency of on the order of 4800 Hz and wherein the producing means comprise means which generate an output data transmission rate of on the order of 9600 BAUD.

11. A method for communicating digital data by radio frequency comprising:
  issuing digital data at a first location;
  superimposing the issued digital data upon a carrier waveform to create a composite sinusoidal waveform containing said digital data;
  transmitting said composite sinusoidal waveform at a predetermined site;
  receiving said composite sinusoidal waveform at a site remote from the predetermined site;
  demodulating a base band signal from the received composite waveform;
  creating positive and negative voltage spikes each time the demodulated base band signal goes positive and negative, respectively;
  communicating said positive and negative voltage spikes to first and second comparator sites;
  comparing the voltage of said spikes to a predetermined voltage level at each comparator site, the comparison at the two sites being of opposite polarity, respectively;
  issuing a constant known voltage signal at each comparator site;
  interrupting said constant voltage signal when the voltage spike exceeds the predetermined voltage level, either in the positive or in the negative, depending on the site;
  integrating the two interrupted voltage signals into a single output digital data signal corresponding to the digital data initially issued; and
  utilizing said output digital data signal.

12. A method according to claim 11 wherein integrating step further comprises initiating a constant voltage at each interruption of the voltage signal at one comparator site and producing zero voltage at each interruption of the voltage signal at the other comparator site.

13. A method according to claim 11 wherein the integrating step further comprises producing data having a data transmission rate substantially equal to twice the frequency of the base band signal.

14. A method according to claim 13 wherein said demodulating step further comprises producing a base band signal having a frequency of on the order of 4800 Hz and wherein said producing data step comprises outputting digital data having a data transmission rate of on the order of 9600 BAUD.

15. A method for producing a square waveform corresponding to a sinusoidal waveform comprising:
  producing a sinusoidal waveform;
  creating positive and negative voltage spikes each time the sinusoidal waveform goes positive and negative, respectively;
  communicating said positive and negative voltage spikes to first and second comparator sites;
  comparing the voltage of said spikes to a predetermined voltage level at each comparator site, the comparison at the two sites being of opposite polarity, respectively;
  issuing a constant known voltage signal at each comparator site;
  interrupting said constant voltage signal when the voltage spike exceeds the predetermined voltage level, either in the positive or in the negative, depending on the site; and integrating the two interrupted voltage signals into a single output square waveform corresponding to the initially produced sinusoidal waveform.

16. A method according to claim 15 wherein the integrating step further comprises initiating a constant voltage at each interruption of the voltage signal at one comparator site and producing a zero voltage at each interruption to the voltage signal at the other comparator site.

17. A method for communicating digital data by sinusoidal waveform comprising:
   generating digital data wherein the digital data is represented by a sinusoidal waveform, each half cycle substantially representing a single digital bit;
   creating positive and negative voltage spikes each time the sinusoidal waveform goes positive and negative, respectively;
   communicating said voltage spikes to first and second comparator sites;
   comparing the voltage of said spikes to a predetermined voltage level at each comparator site, the comparison at the two sites being of opposite polarity, respectively;
   issuing a constant known voltage signal at each comparator site;
   interrupting said constant voltage signal when the voltage spike exceeds the predetermined voltage level, either in the positive or in the negative depending on the site; and
   integrating the two interrupted voltage signals into a single output digital signal corresponding to the initially generated digital data.

18. A method according to claim 17 wherein the integrating step further comprises initiating a constant voltage at each interruption of the first interrupted voltage signal and producing zero voltage at each interruption of the second interrupted voltage signal.

19. A method according to claim 17 wherein the integrating step further comprises producing data having a data transmission rate substantially equal to twice the frequency of the base band signal.

20. A method according to claim 19 wherein said demodulating step further comprises producing a base band signal having a frequency of on the order of 4800 Hz and wherein said producing data step comprises outputting digital data having a data transmission rate of on the order of 9600 BAUD.

* * * * *